United States Patent
Kasuga et al.

(10) Patent No.: US 7,745,361 B2
(45) Date of Patent: Jun. 29, 2010

(54) OPTICAL GLASS, PREFORM FOR PRECISION PRESS MOLDING AND METHOD OF MANUFACTURING THEREOF, OPTICAL ELEMENT AND METHOD OF MANUFACTURING THEREOF

(75) Inventors: Yoshiko Kasuga, Tokyo (JP); Yasuhiro Fujiwara, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/723,468

(22) Filed: Mar. 20, 2007

(65) Prior Publication Data

US 2007/0247721 A1 Oct. 25, 2007

(30) Foreign Application Priority Data

Mar. 24, 2006 (JP) .............................. 2006-082667

(51) Int. Cl.
*C03C 3/064* (2006.01)
*C03C 3/062* (2006.01)
*C03B 7/00* (2006.01)
*C03B 9/16* (2006.01)
*C03B 9/20* (2006.01)

(52) U.S. Cl. .............................. 501/77; 501/73; 65/226
(58) Field of Classification Search .................. 501/73, 501/77, 78, 79; 65/226
See application file for complete search history.

(56) References Cited

U.S. PATENT DOCUMENTS

| 6,251,813 | B1 * | 6/2001 | Sato | 501/78 |
| 6,413,894 | B1 * | 7/2002 | Sato | 501/77 |
| 6,844,279 | B2 * | 1/2005 | Hayashi et al. | 501/50 |
| 7,232,779 | B2 * | 6/2007 | Kasuga et al. | 501/79 |
| 2003/0050177 | A1 * | 3/2003 | Uehara | 501/78 |
| 2003/0100433 | A1 * | 5/2003 | Hayashi et al. | 501/79 |
| 2004/0127343 | A1 * | 7/2004 | Kasuga et al. | 501/78 |
| 2006/0234850 | A1 * | 10/2006 | Hayashi et al. | 501/78 |
| 2007/0232477 | A1 * | 10/2007 | Fujiwara | 501/50 |
| 2008/0119348 | A1 * | 5/2008 | Hayashi et al. | 501/78 |

* cited by examiner

*Primary Examiner*—Karl E Group
*Assistant Examiner*—Noah S Wiese
(74) *Attorney, Agent, or Firm*—Sughrue Mion, PLLC (57) ABSTRACT

The present invention relates to an optical glass having a refractive index (nd) of greater than or equal to 1.65 and an Abbé number (ν (nu)d) of greater than or equal to 50 for use in precision press molding. The glass exhibits that a ratio α (alpha)1/α (alpha)2 is less than 17 when temperature denoting maximum value of differential in amount of elongation of glass relative to temperature differential DELTAT (where DELTAT denotes a constant value of 1° C. or less) over a temperature range from glass transition temperature (Tg) to sag temperature (Ts) is denoted as T1, average coefficient of linear expansion over a range from T1−5° C. to T1+5° C. is denoted as alpha1, and average coefficient of linear expansion over a range from the glass transition temperature (Tg)−160° C. to the glass transition temperature (Tg)−140° C. is denoted as alpha2.

8 Claims, 2 Drawing Sheets

OPTICAL GLASS, PREFORM FOR PRECISION PRESS MOLDING AND METHOD OF MANUFACTURING THEREOF, OPTICAL ELEMENT AND METHOD OF MANUFACTURING THEREOF

CROSS-REFERENCE TO RELATED APPLICATIONS

This application claims benefit of priority under 35 USC 119 to Japanese Patent Application No. 2006-82667 filed on Mar. 24, 2006, which is expressly incorporated herein by reference in its entirety.

BACKGROUND OF THE INVENTION

1. Field of the Invention

The present invention relates to an optical glass having optical constants in the form of a refractive index (nd) of greater than or equal to 1.65 and an Abbé number (ν (nu)d) of greater than or equal to 50; a preform for precision press molding comprised of said glass; a method for manufacturing said preform; and a method for manufacturing optical elements comprised of said glass.

2. Discussion of the Background

The arrival of digital cameras and portable cellular phones equipped with cameras has resulted in the rapid progression of high integration and high functionality in devices employing optical systems. At the same time, the demand for high precision, light weight, compact optical systems has been intensifying.

In recent years, to satisfy these demands, optical designs employing aspherical lenses have increasingly moved into the mainstream. Thus, to stably and economically provide large quantities of aspherical lenses employing highly functional glass, precision press molding techniques (also known as mold optics molding techniques) in which optically functional surfaces are molded directly by press molding without grinding or polishing steps have attracted attention. The demand for optical glass having low temperature softening properties suited to precision press molding is increasing each year. Such glasses include high refractive index and low dispersion glasses with a refractive index (nd) of greater than or equal to 1.65 and an Abbé number (nud) of greater than or equal to 50. An example of a high refractive index and low dispersion glass having low temperature softening properties is described in Japanese Patent No. 2,616,958, which is expressly incorporated herein by reference in their entirety.

In the course of manufacturing optical elements such as lenses by precision press molding, when the glass is precision press molded, damage sometimes occurs during cooling in the pressing mold. Such damage consists of crizzles and cracking. This is particularly prominent in the high refractive index and low dispersion glasses referred to above, and compromises productivity.

Given these circumstances, the present invention has for its object to provide means of manufacturing with high productivity optical elements comprised of high refractive index and low dispersion glass by precision press molding.

The present inventors extensively investigated the causes of the above-described crizzles and cracking and discovered the following.

In precision press molding, once the glass has been pressed into a desired shape in a pressing mold, the glass is maintained within the pressing mold, which is kept closed, so that the glass surface retains the shape transferred by the mold surface while being cooled to a temperature range at which the glass tends not to deform. At that time, the portion of the glass in proximity to the surface cools rapidly, but the center portion of the glass cools slowly. Thus, even after the portion near the surface has reached a temperature below the glass transition temperature, the temperature at the center is still higher than the glass transition temperature. When the present inventors examined expansion properties relating to conventional glasses prone to crizzles and cracking, they found that the ratio of the coefficients of linear thermal expansion above and below the glass transition temperature was considerably higher than that of glasses not prone to crizzles and cracking. That is, in such glasses, when the temperature near the surface was lower than the glass transition temperature and the temperature at the center was higher than the glass transition temperature, there was much greater contraction of the center portion than of the portion in the vicinity of the surface. This phenomenon occurred when the glass was enclosed within the pressing mold, producing great stress in glass that had lost the ability to undergo plastic deformation. When the glass is firm in structure, no damage occurs even when stress is generated. However, the relatively weak structure of high refractive index and low dispersion glass falling within the above-stated optical constant ranges is thought to result in crizzles and cracking.

Accordingly, when the present inventors conducted further research based on these discoveries, they found that reducing the difference between the coefficients of expansion above and below the glass transition temperature in conventional high refractive index and low dispersion glass reduced the difference in the degree of contraction near the surface and in the center of the glass during the cooling step, thereby inhibiting crizzles and cracking. The present invention was devised on this basis.

The present invention provides an optical glass that tends not to be damaged during precision press molding, a preform for precision press molding that is comprised of said glass, and an optical element that is comprised of said glass.

Further, the present invention permits the manufacturing of optical elements at high productivity without damaging the glass.

SUMMARY OF THE INVENTION

The present invention relates to an optical glass having a refractive index (nd) of greater than or equal to 1.65 and an Abbé number (ν (nu)d) of greater than or equal to 50 for use in precision press molding, such that the ratio α (alpha)1/α (alpha)2 is less than 17 when the temperature denoting the maximum value of the differential in the amount of elongation of the glass relative to the temperature differential Δ (DELTA)T (where Δ (DELTA)T denotes a constant value of 1° C. or less) over the temperature range from the glass transition temperature (Tg) to the sag temperature (Ts) is denoted as T1, the average coefficient of linear expansion over the range from T1−5° C. to T1+5° C. is denoted as alpha1, and the average coefficient of linear expansion over the range from the glass transition temperature (Tg)−160° C. to the glass transition temperature (Tg)−140° C. is denoted as alpha2.

The present invention further relates to a preform for precision press molding comprised of said glass; a method for manufacturing said preform; and a method for manufacturing optical elements comprised of said glass.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein.

DESCRIPTIONS OF THE EMBODIMENTS

The following preferred specific embodiments are, therefore, to be construed as merely illustrative, and not limitative of the remainder of the disclosure in any way whatsoever. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention is described in greater detail below.

[Optical Glass]

The optical glass of the present invention is an optical glass having a refractive index (nd) of greater than or equal to 1.65 and an Abbé number (ν (nu)d) of greater than or equal to 50 for use in precision press molding, such that the ratio α (alpha)1/α (alpha)2 is less than 17 when the temperature denoting the maximum value of the differential in the amount of elongation of the glass relative to the temperature differential Δ (DELTA)T (where Δ (DELTA)T denotes a constant value of 1° C. or less) over the temperature range from the glass transition temperature (Tg) to the sag temperature (Ts) is denoted as T1, the average coefficient of linear expansion over the range from T1−5° C. to T1+5° C. is denoted as alpha1, and the average coefficient of linear expansion over the range from the glass transition temperature (Tg)−160° C. to the glass transition temperature (Tg)−140° C. is denoted as alpha2.

The ratio alpha1/alpha2 is an indicator of the difference between the coefficient of expansion above the glass transition temperature and the coefficient of expansion below the glass transition temperature. As set forth above, in the present invention, in high refractive index and low dispersion glasses, reducing the difference between the coefficient of expansion above the glass transition temperature and that below the glass transition temperature reduces the difference in the amount of contraction at the glass surface and within the glass during cooling, thereby inhibiting crizzles and cracking.

The ratio alpha1/alpha2 will be described below.

Coefficient of thermal expansion alpha1 is the average coefficient of linear expansion over the range T1−5° C. to T1+5° C. when the temperature denoting the maximum value of the differential in the amount of elongation of the glass relative to the temperature differential DELTAT (where DELTAT denotes a constant value of 1° C. or less) over the temperature range from the glass transition temperature (Tg) to the sag temperature (Ts) is denoted as T1; it is a value representing the coefficient of linear expansion over the temperature range (above the glass transition temperature) from the glass transition temperature (Tg) to the sag temperature (Ts).

Average coefficient of linear expansion alpha2 is the average coefficient of linear expansion over the range from a temperature 160° C. below the glass transition temperature (Tg) (Tg−60° C.) to a temperature 140° C. below the glass transition temperature (Tg) (Tg−140° C.); it is a value representing the coefficient of linear expansion at temperatures below the glass transition temperature.

The glass transition temperature (Tg) and the sag temperature (Ts) are values that can be measured using a thermomechanical analyzer made by Rigaku Denki K.K. at a 10 g load and a rate of temperature increase of 4° C./minute, for example. The coefficients of thermal expansion thereof (alpha1, alpha2) can be calculated from the results of thermomechanical analysis obtained using this device.

The ratio alpha1/alpha2 in the optical glass of the present invention is less than 17. When this ratio exceeds 17, the difference in the amount of contraction between the glass surface and interior increases in the cooling step, potentially causing crizzles and cracking. The ratio alpha1/alpha2 is desirably 16.5 or less, preferably 16 or less, and still more preferably, 15 or less. The smaller the difference between the coefficients of expansion above and below the glass transition temperature, the better the inhibition of crizzles and cracking. However, in terms of the properties of the glass, alpha1 is greater than alpha2. In practical terms, the lower limit of the ratio alpha1/alpha2 can be considered to be 1.01. In terms of achieving a glass satisfying the various above-stated properties, the ratio alpha1/alpha2 is desirably 2.5 or more.

Typical components that raise alpha1 are $B_2O_3$ and CaO. Typical components that lower alpha1 are $SiO_2$ and $Li_2O$. From the perspective of affecting alpha1, $La_2O_3$ and $Gd_2O_3$ have effects falling between those of $B_2O_3$ and CaO on the one hand and $SiO_2$ and $Li_2O$ on the other. For example, $B_2O_3$ or CaO can be replaced with $SiO_2$ or $Li_2O$ to lower alpha1, while substitution in the other direction can be used to increase alpha1. The amount of change in alpha1 can be controlled by the amount of such substitution. Substitution of $La_2O_3$ and $Gd_2O_3$ by or for $B_2O_3$ and CaO, as well as $La_2O_3$ and $Gd_2O_3$ by or for $SiO_2$ and $Li_2O$, can also be employed in the same manner.

Alpha2 can be raised by increasing the cationic compounds with large ionic radii in the glass, and lowered by increasing the cationic compounds with small ionic radii. For example, as regards divalent cationic components: the ionic radius of Ba>the ionic radius of Sr>the ionic radius of Ca>the ionic radius of Mg>the ionic radius of Zn. The ionic radii of La and Li are larger than that of Ca. The ionic radius of Ca is larger than those of B and Si. Accordingly, substitution of these elements for each other can be used to control alpha2.

The above control methods can be combined in the present invention to keep the ratio alpha1/alpha2 to less than 17. However, from the perspective of controlling alpha1/alpha2, alpha1 has a greater effect than alpha2, and the level of change achieved by the above substitution is greater for alpha1. Thus, the ratio alpha1/alpha2 is desirably controlled by paying close attention to and controlling alpha1. By way of example, alpha1 desirably ranges from $50 \times 10^{-6}$ to $200 \times 10^{-6}/°$ C., and alpha2 desirably ranges from $50 \times 10^{-7}$ to $200 \times 10^{-7}/°$ C.

Since the optical glass of the present invention is employed in precision press molding, the glass transition temperature is desirably less than or equal to 630° C. However, at a glass transition temperature of less than 400° C., it sometimes becomes difficult to evaluate alpha2. Further, there is also a risk of obstruction when forming a carbon-containing coating on the preform surface to facilitate glass extension during press molding. Thus, a glass transition temperature of 450 to 630° C. is desirable, with 450 to 620° C. being preferred.

Further, the optical glass of the present invention desirably has a sag temperature of less than or equal to 670° C., preferably 490 to 660° C., more preferably 500 to 640° C. and still more preferably, 530 to 630° C. When the glass transition temperature and sag temperature of the optical glass are low, it is possible to lower the glass heating temperature during press molding. As a result, the time required to heat and cool the glass decreases and throughput in press molded product manufacturing is enhanced. Since it is possible to lower the heating temperature of the pressing mold, the service lifetime of the pressing mold can be extended.

The optical glass of the present invention has a refractive index (nd) of 1.65 or greater and an Abbé number (nud) of 50 or greater. The upper limits of the refractive index and Abbé number of the glass of the present invention are not specifically limited. However, in consideration of low temperature softening properties suited to press molding and glass stability, which are important to the formation of high quality preforms, a refractive index (nd) of 1.8 or less and/or an Abbé number (nud) of 60 or less are desirable.

Desirable compositions of the present invention will be described next.

The optical glass of the present invention can comprise glass components in the form of $B_2O_2$, $SiO_2$, $La_2O_3$, alkali metal oxides, and divalent metal oxides.

Individual glass components will be described below. Unless specifically stated otherwise, contents and combined contents denote mole percentages and ratios of contents and combined contents denote mole ratios.

$B_2O_3$ and $SiO_2$ are glass network forming components. To strengthen the structure of the glass and reduce crizzles and cracking, the ratio ($SiO_2/B_2O_3$) of the $SiO_2$ content to the $B_2O_3$ content is desirably 0.1 to 0.90. When the refractive index (nd) is 1.65 to 1.70, the content of $SiO_2$ can be increased relative to the content of $B_2O_3$ to strengthen the structure of the glass. Thus, $SiO_2/B_2O_3$ desirably exceeds 0.5 but does not exceed 0.90, preferably exceeds 0.5 but does not exceed 0.85, more preferably exceeds 0.5 but is less than 0.8, still more preferably ranges from 0.55 to 0.75, and still more preferably ranges from 0.55 to 0.7. When the refractive index (nd) exceeds 1.70, it is desirable for $SiO_2/B_2O_3$ to be 0.1 to 0.5, preferably 0.1 to 0.4, to maintain desired properties.

$La_2O_3$ is a component that imparts a high refractive index and serves to increase the chemical durability of the glass.

$Gd_2O_3$, $Y_2O_3$, and $Yb_2O_3$, which function in the same manner as $La_2O_3$, may be incorporated as optional components. The incorporation of $La_2O_3$ along with at least one oxide from among $Gd_2O_3$, $Y_2O_3$, and $Yb_2O_3$ is desirable to increase the high temperature stability of the glass.

Alkali metal oxides impart low temperature softening properties. Among them, the incorporation of $Li_2O$ imparts low temperature softening properties while raising the refractive index of the glass. $Li_2O$ has a greater effect in this regard than other alkali metal oxides, permitting the obtaining of a desired refractive index and low temperature softening properties so long as it is not incorporated in excessive quantities causing loss of resistance to devitrification or chemical durability.

ZnO, which imparts low temperature softening properties while raising the refractive index of the glass, and alkaline earth metal oxides such as MgO, CaO, SrO, and BaO, which serve to adjust optical constants, can be incorporated as divalent metal oxides.

It suffices to add $Sb_2O_3$, which can be optionally added as a clarifying agent, to such a composition in the present invention to obtain a composition that simultaneously achieves the above-stated properties. The contents of the individual components desirably fall within the following ranges.

Both $B_2O_3$ and $SiO_2$ are network-forming components. To enhance the stability of the glass, the combined quantity of these two components ($SiO_2+B_2O_3$) is desirably 50 to 72 percent, preferably 50 to 70 percent, more preferably 50 to 68 percent, and still more preferably, 50 to 65 percent. The ratio of the content of $SiO_2$ to $B_2O_3$ ($SiO_2/B_2O_3$) is desirably maintained as set forth above to render the outflow viscosity of the glass melt more suitable to the molding of preforms and improve chemical durability while strengthening the glass structure, reducing the change in viscosity relative to temperature, resolving the problem of glass cracking, and maintaining low temperature softening properties.

The content of $SiO_2$ is defined both in combination with the content of $B_2O_3$ and based on the ratio to the $B_2O_3$ content. However, when the refractive index (nd) is 1.65 to 1.70, the content of $SiO_2$ is desirably 15 to 30 percent, preferably 18 to 30 percent, more preferably 18 to 27 percent, and still more preferably, 19 to 25 percent. When the refractive index (nd) exceeds 1.70, the $SiO_2$ content is desirably 4 to 18 percent, preferably 5 to 16 percent, and more preferably, 6 to 15 percent.

The content of $B_2O_3$ is also defined both in combination with the content of $SiO_2$ and based on the ratio to the $SiO_2$ content. However, when the refractive index (nd) is 1.65 to 1.70, the $B_2O_3$ content is desirably 25 to 45 percent, preferably 30 to 40 percent, and more preferably 32 to 37 percent. When the refractive index (nd) exceeds 1.70, the $B_2O_3$ content is desirably 38 to 68 percent, preferably 42 to 65 percent, and more preferably, 44 to 62 percent.

Compared to other alkali metal oxides, $Li_2O$ raises the refractive index higher and lowers the glass transition temperature more without compromising chemical durability, thereby enhancing the melting properties of the glass. However, when introduced in excessive quantity, these effects are difficult to achieve. Further, when introduced in excessive quantity, the resistance to devitrification of the glass decreases, it becomes difficult to directly mold high quality preforms from an outflowing glass melt, and weatherability deteriorates. Accordingly, when the refractive index (nd) is 1.65 to 1.70, the $Li_2O$ content is desirably kept to 5 to 20 percent, preferably 6 to 18 percent, and more preferably, 9 to 18 percent. When the refractive index (nd) exceeds 1.70, the $Li_2O$ content is desirably 1 to 14 percent, preferably 2 to 12 percent, and more preferably, 3 to 11 percent.

$Na_2O$ and $K_2O$ can be incorporated in addition to $Li_2O$ as alkali metal oxides. However, when the above effects of $Li_2O$ are considered, irrespective of the refractive index, the ratio ($Li_2O/R'_2O$) of the $Li_2O$ content to the combined content $R'_2O$ of $Li_2O$, $Na_2O$, and $K_2O$ is desirably 0.8 to 1, preferably 1.

To maintain the stability and chemical durability of the glass, regardless of the refractive index, the ratio ($R'_2O/(SiO_2+B_2O_3)$) of $R'_2O$ to the combined quantity of $SiO_2$ and $B_2O_3$ is desirably less than 0.3, preferably less than 0.29.

$La_2O_3$ has the effects of raising the refractive index and increasing chemical durability and weatherability without lowering the stability of the glass or increasing dispersion. Thus, it is desirably made an essential component of the glass of the present invention. When incorporated in excessively small quantity, these effects are not achieved. When incorporated in excessively large quantity, glass stability decreases, the glass transition temperature rises, both the molding of high-quality preforms and precision press molding become difficult, and dispersion increases. Accordingly, the content of $La_2O_3$ is desirably 0.5 to 22 percent, preferably 1 to 15 percent. When the refractive index (nd) is 1.65 to 1.70, the content of $La_2O_3$ is desirably 2 to 10 percent, preferably 3 to 10 percent. When the refractive index (nd) exceeds 1.70, the content of $La_2O_3$ is desirably 5 to 15 percent, preferably 6 to 14 percent.

$Gd_2O_3$ may be employed as an optional component. In the same manner as $La_2O_3$, it raises the refractive index without loss of glass stability or low dispersion properties, and increases chemical durability and weatherability. In particular, when employed together with $La_2O_3$, it further increases the stability of the glass with respect to devitrification. However, when employed in excessive quantity, it lowers the stability of the glass, raises the glass transition temperature, and renders preform molding and precision press molding difficult.

$Y_2O_3$ may also be employed as an optional component. In the same manner as $Gd_2O_3$, it raises the refractive index without loss of glass stability or low dispersion properties, and increases chemical durability and weatherability. In particular, when employed together with $La_2O_3$, it further increases the stability of the glass with respect to devitrification. However, when employed in excessive quantity, it lowers the stability of the glass, raises the glass transition temperature, and renders preform molding and precision press molding difficult.

$Yb_2O_3$ may also be employed as an optional component. In the same manner as $Gd_2O_3$ and $Y_2O_3$, it raises the refractive index without loss of glass stability or low dispersion properties, and increases chemical durability and weatherability. In particular, when employed together with $La_2O_3$, it further increases the stability of the glass with respect to devitrification. However, when employed in excessive quantity, it lowers the stability of the glass, raises the glass transition temperature, and renders preform molding and precision press molding difficult.

Thus, the combined use of the components $Gd_2O_3$, $Y_2O_3$, $Yb_2O_3$, and $La_2O_3$ increases the stability of the glass with respect to devitrification and effectively permits the molding of high quality preforms directly from glass melt. Thus, the combined quantity of $Gd_2O_3$, $Y_2O_3$, and $Yb_2O_3$ is desirably greater than or equal to 1 percent. However, when this combined quantity is excessively large, the stability of the glass decreases and the glass transition temperature rises. Thus, the upper limit to the combined content of $Gd_2O_3$, $Y_2O_3$, and $Yb_2O_3$ is desirably 15 percent. When the refractive index (nd) is 1.65 to 1.70, the combined quantity of $Gd_2O_3$, $Y_2O_3$, and $Yb_2O_3$ is desirably 1 to 10 percent, preferably 1 to 6 percent. When the refractive index (nd) exceeds 1.70, a range of 3 to 14 percent is desirable and a range of 4 to 12 percent is preferred. Among components $Gd_2O_3$, $Y_2O_3$, and $Yb_2O_3$, components $Gd_2O_3$ and $Y_2O_3$ are advantageous for obtaining the above effects. Thus, when the refractive index (nd) is 1.65 to 1.70, the combined content of $Gd_2O_3$ and $Y_2O_3$ is desirably 1 to 10 percent, preferably 1 to 6 percent, and when the refractive index (nd) exceeds 1.70, desirably 3 to 14 percent, preferably 4 to 12 percent. The ratio (($Gd_2O_3+Y_2O_3+Yb_2O_3$)/$La_2O_3$) of the combined contents of $Gd_2O_3$, $Y_2O_3$, and $Yb_2O_3$ to $La_2O_3$ is desirably kept within a range of 0.3 to 1.5 to increase glass stability irrespective of the refractive index.

When the refractive index (nd) is 1.65 to 1.70, the $Gd_2O_3$ content desirably falls within a range of from 0 to 8 percent, preferably 0 to 6 percent. When the refractive index (nd) exceeds 1.70, the $Gd_2O_3$ content desirably falls within a range of 0 to 12 percent, preferably 1 to 12 percent, and more preferably, 1 to 10 percent.

When the refractive index (nd) is 1.65 to 1.70, the $Y_2O_3$ content desirably falls within a range of from 0 to 5 percent, preferably 0.1 to 3 percent, more preferably, 0.1 to 2.5 percent. When the refractive index (nd) exceeds 1.70, the $Y_2O_3$ content desirably falls within a range of from 0.1 to 6 percent, preferably 0.5 to 6 percent, and still more preferably, 0.5 to 5 percent.

Irrespective of the refractive index, the content of $Yb_2O_3$ desirably falls within a range of from 0 to 5 percent, preferably 0 to 3 percent, with no incorporation at all being particularly preferred.

ZnO is a component that lowers the melting point, liquidus temperature, and glass transition temperature; increases the chemical durability and weatherability of the glass; and raises the refractive index. It is desirably employed as an essential component of the glass of the present invention. ZnO enhances the weatherability of the glass much better than other divalent components. By contrast, although BaO raises the refractive index, it compromises the weatherability of the glass. Thus, ZnO can be incorporated in a required quantity instead of BaO. To achieve an adequate effect by incorporating ZnO, when the refractive index (nd) is 1.65 to 1.70, ZnO is desirably employed in a quantity of 5 to 20 percent, preferably 6 to 20 percent, and more preferably, 7 to 20 percent. When the refractive index (nd) exceeds 1.70, the content of ZnO is desirably 1 to 18 percent, preferably 2 to 16 percent, and more preferably, 3 to 14 percent.

MgO, CaO, SrO, and BaO serve to adjust optical constants. The CaO content is desirably 0 to 14 percent to achieve the desired objective, irrespective of the refractive index. The use of CaO together with $SiO_2$ and $B_2O_3$ serves to lower the glass transition temperature. Accordingly, CaO is desirably incorporated in a quantity of 1 percent or greater, with a CaO content of 1 to 14 percent being preferred. Additionally, when the refractive index (nd) is 1.65 to 1.70, it becomes difficult to achieve a glass with good weatherability without suitably blending divalent components, including ZnO, with alkaline earth metal oxides. Thus, the ratio (ZnO/RO) of the ZnO content to the combined content RO of MgO, CaO, SrO, and BaO is desirably 0.5 or greater. The preferred ZnO/RO ratio is 0.5 to 4, with 0.6 to 3 being of even greater preference.

Irrespective of the refractive index, the combined content RO of MgO, CaO, SrO, and BaO is desirably 1 to 14 percent, preferably 2 to 14 percent, to adjust optical constants and lower the glass transition temperature.

Irrespective of the refractive index, attention is desirably paid to the blending of MgO, CaO, SrO, and BaO to both lower the glass transition temperature and achieve good weatherability. As set forth above, CaO serves to lower the glass transition temperature when incorporated in suitable quantity. Since the incorporation of BaO compromises weatherability, the ratio (CaO/RO) of the CaO content to RO is desirably 0.5 to 1, preferably 0.8 to 1. Further, the ratio (BaO/RO) of the BaO content to RO is desirably 0 to 0.2, with 0 being particularly preferred.

As set forth above, although BaO raises the refractive index, it also decreases the weatherability of the glass; that is, diminishes chemical durability. In the present invention, irrespective of the refractive index, the ratio of the content of BaO to the combined quantity of other components raising the refractive index in the form of $La_2O_3$, $Gd_2O_3$, $Y_2O_3$, and $Yb_2O_3$ can be controlled to achieve a desired refractive index, even without incorporation of BaO. That is, BaO can be left out. When incorporated, the quantity of BaO is desirably reduced so that the ratio of the combined quantity of $La_2O_3$, $Gd_2O_3$, $Y_2O_3$, and $Yb_2O_3$ to the quantity of BaO (($La_2O_3+Gd_2O_3+Y_2O_3$)/BaO)) is 10 or more. An optical glass possessing both desired optical properties and good chemical durability can be achieved in this manner. When BaO is incorporated, the ratio ($La_2O_3+Gd_2O_3+Y_2O_3+Yb_2O_3$)/BaO is desirably 11 or greater, preferably 12 or greater, more preferably 15 or greater, and still more preferably, 18 or greater.

$Sb_2O_3$ is an optional additive employed as a clarifying agent. Since an adequate effect is achieved at 1 percent or less, the content is desirably 0 to 1 percent, preferably 0 to 0.06 percent. The addition of an excessive quantity of $Sb_2O_3$ oxidizes the molding surface of the pressing mold during precision press molding, negatively affecting the service lifetime of the pressing mold and the like, and is therefore undesirable from the perspective of precision press molding.

$Al_2O_3$ has the effects of enhancing the durability and weatherability of the glass and can be incorporated as an optional component. However, at a content exceeding 5 percent, the glass transition temperature rises sharply and there is a risk of optical constants falling outside the desired ranges. Thus, an $Al_2O_3$ content of 0 to 5 percent is desirable, with 0 to 3 percent being preferred and 0 to 2 percent being of even greater preference.

$ZrO_2$ can be incorporated as an optional component to increase the weatherability of the glass and adjust optical constants. However, when the content exceeds 5 percent, there is a risk that optical constants will fall outside the desired ranges and that low temperature softening properties will deteriorate. Accordingly, irrespective of the refractive index, the content of $ZrO_2$ in the optical glass of the present invention is desirably 0 to 5 percent, preferably 0.1 to 4 percent.

$Ta_2O_5$, $WO_3$, $Nb_2O_5$, $TiO_2$, $P_2O_5$, and F can be incorporated to the extent that the object of the present invention is not lost. However, in consideration of starting material cost, the effects on various properties of the glass, and productivity, the incorporation of these compounds should be controlled. The combined content of $Ta_2O_5$, $WO_3$, $Nb_2O_5$, $TiO_2$, $P_2O_5$, and F is desirably less than 5 percent, preferably less than 2 percent, more preferably less than 1 percent, and still more preferably, less than 0.5 percent, with no incorporation at all being of greatest preference. Of these, F is desirably not incorporated because it makes it difficult to mold high quality preforms directly from glass melt.

In view of negative effects on the environment, the incorporation of Pb, Cr, Cd, As, Th, and Te is to be avoided. Pb has conventionally been employed as a principal component of optical glass to raise the refractive index, but in addition to the above problems, it tends to be reduced by precision press molding in a non-oxidizing gas atmosphere. This causes problems in that the precipitating metallic lead adheres to the molding surfaces of the pressing mold, reducing the surface precision of press molded products. $As_2O_3$ has also been conventionally added as a clarifying agent. However, in addition to the above problems, it causes such problems as oxidizing the molding surfaces of the pressing mold, thereby shortening the service lifetime of the mold, and should thus not be incorporated.

The optical glass of the present invention can be manufactured by heating and melting glass starting materials. The glass starting material employed may be in the form of suitable carbonates, nitrates, oxides, and the like. These starting materials are weighed out in prescribed proportions and mixed to obtain a blended starting material. The starting material is then placed in a melting furnace that has been heated to 1,200 to 1,300° C., for example. The starting material is then melted, clarified, stirred, and homogenized to obtain a homogeneous glass melt free of bubbles and undissolved matter. The glass melt is molded and gradually cooled to obtain the optical glass of the present invention.

[Preform for Precision Press Molding and Method for Manufacturing a Preform for Precision Press Molding]

The preform for precision press molding and the method for manufacturing preforms of the present invention will be described next. The preform for precision press molding can be referred to as "precision press molding preform" or simply as "preform". A preform is a molded member of glass equal in weight to a precision press molded article. The preform is molded into a shape corresponding to the shape of a precision press molded article. Examples are spherical shapes and ellipsoids of revolution. The preform is heated to a viscosity permitting precision press molding and subjected to precision press molding.

The preform for precision press molding of the present invention is comprised of the above-described optical glass of the present invention. The surface of the preform of the present invention may be provided as needed with a thin mold release film. Optical elements having desired optical constants can be manufactured with high productivity by precision press molding such preforms. Further, as set forth above, the glass composition can be adjusted to increase the stability of the glass in the high temperature range and increase the viscosity of the glass melt at outflow. Thus, the method of molding preforms in a process of cooling glass gobs obtained by separating a glass melt flowing out of a pipe affords the advantage of permitting the manufacturing of high quality preforms with high productivity.

The present invention also relates to a method for manufacturing preforms for precision press molding by: (1) determining the glass composition to impart to the glass a refractive index (nd) of greater than or equal to 1.65 and an Abbé number (nud) of greater than or equal to 50, and to achieve a ratio alpha1/alpha2 of less than 17 when the temperature denoting the maximum value of the differential in the amount of elongation of the glass relative to the temperature differential DELTAT (where DELTAT denotes a constant value of 1° C. or less) over the temperature range from the glass transition temperature (Tg) to the sag temperature (Ts) is denoted as T1, the average coefficient of linear expansion over the range from T1−5° C. to T1+5° C. is denoted as alpha1, and the average coefficient of linear expansion over the range from the glass transition temperature (Tg)−160° C. to the glass transition temperature (Tg)−140° C. is denoted as alpha2; and (2) manufacturing preforms for precision press molding by using glass of the composition thus determined.

As set forth above, employing a ratio of alpha1/alpha2 of less than 17 makes it possible to reduce or prevent crizzles and cracking during precision press molding in high refractive index and low dispersion glass. In the method for manufacturing preforms for precision press molding of the present invention, glass the composition of which is determined so that the ratio of alpha1/alpha2 is less than 17 to permit precision press molding with high productivity without causing crizzles or cracking during precision press molding is employed to manufacture preforms for precision press molding. The preforms for precision press molding thus manufactured can be employed to produce with high productivity optical elements comprised of high refractive index and low dispersion glass having desired optical constants. The ratio of alpha1/alpha2 is achieved by the control methods set forth above. In the method for manufacturing preforms for precision press molding of the present invention, these control methods may be suitably combined to determine a glass composition yielding a ratio of alpha1/alpha2 of less than 17.

The preform may be manufactured by a method comprising the steps of causing a glass melt to flow out of a pipe, separating a glass melt gob, and cooling the glass melt gob to form a preform for precision press molding (referred to as "Method 1" hereinafter), and by a method comprising the steps of producing a molded glass body from a glass melt and either cutting or slicing; grinding; and polishing the molded glass body (referred to as "Method 2" hereinafter).

A specific example of Method 1 is the manufacturing method whereby a preform of prescribed weight is molded by the steps of separating a glass melt gob of prescribed weight from an outflowing glass melt flow and cooling the glass gob. This method is advantageous in that mechanical processing such as cutting, grinding, and polishing is unneeded. Mechanically processed preforms require annealing prior to mechanical processing to reduce deformation of the glass to a degree where damage does not occur. However, the above method does not require annealing to prevent damage. Further, it gives preforms with smooth surfaces. In this method, from the perspective of imparting a smooth, clean surface, it is desirable to form the preform while floating it by the application of wind pressure. It is also desirable for no cutting marks, known as shear marks, to be present. Shear marks are produced as the outflowing glass melt is cut by a blade. When shear marks remain through the stage of molding a precision press molded product, they end up becoming defects. Thus, shear marks are desirably eliminated at the preform stage. Methods of separating glass melt that do not generate shear marks include causing the glass melt to drip down from the outflow pipe, and supporting the front end of the glass melt flow flowing out of the outflow pipe and removing this support at a timing permitting the separation of a glass melt gob of prescribed weight (known as the "drop-cut method"). In the drop-cut method, the glass is separated at a constriction forming between the front end of the glass melt flow and the tip of the outflow pipe, yielding a glass melt gob of prescribed weight. Next, the glass melt gob obtained is molded into a shape suited to press molding while in a softened state.

In Method 2, a glass melt is made to flow into a casting mold to mold a molded glass member comprised of the above-described optical glass, and the molded glass member is mechanically processed to produce a preform of prescribed weight. The glass is desirably processed to fully remove residual distortion by annealing prior to mechanical processing to prevent damage.

[Optical Element and Method for Manufacturing Optical Elements]

The optical element of the present invention is comprised of the above-described optical glass of the present invention. The optical element of the present invention is characterized by a high refractive index and low dispersion in the same manner as the optical glass of the present invention constituting the optical element.

Examples of the optical element of the present invention are various lenses such as spherical lenses, aspherical lenses, and microlenses; diffraction gratings; lens with diffraction gratings; lens arrays; and prisms. These optical elements are desirably obtained by heating, softening, and precision press molding the preform of the present invention.

Optical films such as antireflective films, fully reflective films, partially reflective films, and films having spectral properties may be provided on the optical element.

The method for manufacturing optical elements will be described next.

In the method for manufacturing optical elements of the present invention, the preform of the present invention or a preform for precision press molding manufactured by the method for manufacturing a preform of the present invention is heated and precision press molded with a precision pressing mold to manufacture an optical element.

The precision press molding method, also known as the mold optics molding method, is already well known in the field of art to which the present invention pertains.

Any surface of an optical element that transmits, refracts, diffracts, or reflects rays of light is called an optically functional surface. In the example of a lens, lens surfaces such as the aspherical surface of an aspherical lens and the spherical surface of a spherical lens both correspond to optically functional surfaces. In precision press molding, the molding surface of the pressing mold is precisely transferred to the glass to form an optically functional surface by press molding. That is, to finish an optically functional surface, no mechanical processing such as grinding or polishing is required.

Accordingly, the method for manufacturing optical elements of the present invention is suited to the manufacturing of optical elements such as lenses, lens arrays, diffraction gratings, and prisms, and is optimal for the manufacturing of aspherical lenses with high productivity.

The method for manufacturing optical elements of the present invention permits the manufacturing of optical elements having the above-described optical properties and permits adjustment of the glass composition as set forth above to impart low temperature processing properties to the preform, thereby permitting press molding of the glass at relatively low temperature. Thus, the load on the molding surface of the pressing mold is reduced and the service lifetime of the pressing mold (or mold release film when a mold release film is provided on the molding surface) is extended. Adjustment of the glass composition increases the stability of the glass constituting the preform, making it possible to effectively prevent devitrification of the glass during the reheating and pressing steps. Further, the entire series of steps from melting the glass to obtaining the final product can be conducted with high productivity.

A known pressing mold may be employed for precision press molding, such as a mold made of a material such as silicon carbide, an ultrahard material, or stainless steel having molding surfaces that have been coated with a mold release film. The mold release film employed may be a carbon-containing film, a noble metal alloy film, or the like. The pressing mold is equipped with upper and lower molds, and as necessary, a drum mold. Of these, to effectively reduce or prevent damage to glass molded articles during press molding, the use of a pressing mold comprised of silicon carbide or an ultrahard alloy (particularly one made of an ultrahard alloy not containing binder, such as a pressing mold made of WC) is desirable. The providing of a mold release film in the form of a carbon-containing film on the molding surface of the mold is also desirable.

Precision press molding is desirably conducted using a non-oxidizing gas atmosphere during molding to keep the molding surfaces of the pressing mold in good condition. Examples of preferred non-oxidizing gases are nitrogen and mixtures of nitrogen and hydrogen. Particularly when employing a pressing mold with molding surfaces equipped with a mold release film in the form of a carbon-containing film and when employing a pressing mold comprised of silicon carbide, it is necessary to conduct precision press molding in such a non-oxidizing atmosphere.

Precision press molding methods particularly suited to the method for manufacturing an optical element of the present invention will be described next.

(Precision Press Molding Method 1)

In this method, a preform is introduced to the pressing mold, the pressing mold and preform are both heated, and precision press molding is conducted ("Precision Press Molding Method 1" hereinafter).

In Precision Press Molding Method 1, the pressing mold and preform are both desirably heated to a temperature at which the glass constituting the preform exhibits a viscosity of $10^6$ to $10^{12}$ dPa·s to conduct precision press molding.

The precision press molded article is desirably removed from the pressing mold after being cooled to a temperature at which the glass exhibits a viscosity of 1012 dPa·s or more, preferably $10^{14}$ dPa·s or more, and more preferably, $10^{16}$ dPa·s or more.

Under these conditions, the shape of the molding surfaces of the pressing mold can be precisely transferred to the glass and the precision press molded article can be removed without deformation.

(Precision Press Molding Method 2)

This method is characterized in that a preform that has been heated to one temperature is introduced into a pressing mold that has been preheated to another temperature and the preform is precision press molded ("Precision Press Molding Method 2" hereinafter). This method allows the preform to be preheated prior to being introduced into the pressing mold, thereby shortening the cycle time and permitting the manufacturing of optical elements that have good surface precision and are free of surface defects.

The temperature to which the pressing mold is preheated is desirably lower than that to which the preform is preheated. Such preheating keeps down the temperature to which the pressing mold is heated, thereby reducing wear and tear on the pressing mold.

In Precision Press Molding Method 2, the preform is desirably preheated to a temperature at which the glass constituting the preform exhibits a viscosity of $10^9$ dPa·s or less, preferably $10^9$ dPa·s.

Further, the preform is desirably preheated while being floated; preheating is preferably conducted to a temperature at which the glass constituting the preform exhibits a viscosity of $10^{5.5}$ to $10^9$ dPa·s, more preferably greater than or equal to $10^{5.5}$ but less than $10^9$ dPa·s.

Cooling of the glass is desirably begun simultaneously with the start of, or during, pressing.

The temperature of the pressing mold is desirably adjusted to below the temperature to which the preform is preheated. It suffices to use a temperature at which the glass exhibits a viscosity of $10^9$ to $10^{12}$ dPa·s as yardstick.

In this method, the press molded article is desirably removed from the mold after being cooled to a temperature at which the glass exhibits a viscosity of $10^{12}$ dPa·s or more following press molding.

The optical element that has been precision press molded is removed from the pressing mold and gradually cooled as necessary. When the molded article is an optical element such as a lens, an optical film may be coated on the surface thereof as needed.

EXAMPLES

The present invention will be further described below through examples. However, the present invention is not limited to the forms shown in the examples.

Manufacturing Optical Glass

Table 1 gives the glass compositions of Examples 1 to 18 and Comparative Examples 1 and 2. Various corresponding oxides, hydroxides, carbonates, and nitrates were employed as the starting materials of the various components for each of these glasses. The starting materials were weighed out so as to yield the compositions indicated in Table 1 following vitrification, thoroughly mixed, charged to a platinum crucible, melted at a temperature range of 1,200 to 1,300° C. in an electric furnace, homogenized by stirring, clarified, and cast in a metal mold that had been preheated to suitable temperature. The cast glass was cooled to the glass transition temperature and then directly introduced into an annealing furnace, where it was gradually cooled to room temperature. Various optical glasses were thus obtained.

The following procedures were employed to determine the glass transition temperature (Tg), sag temperature (Ts), and alpha1/alpha2 ratio of the optical glass of Example 14. The glass transition temperatures (Tg), sag temperatures (Ts), and alpha1/alpha2 ratios of the other optical glasses were similarly obtained. The values obtained are given in Table 2.

1. A thermomechanical analyzer was employed. A constant weight of 10 g was applied in the longitudinal direction of cylindrical glass samples measuring 20 mm in length and 5 mm in diameter that had been adequately annealed and the glass samples were heated at a constant rate of 4° C. per minute. The amount of elongation of the samples was repeatedly measured at 15 sec intervals. Accordingly, measurement was conducted at intervals of 1° C. (DELTAT=1° C.). The TMA curve shown in FIG. 1 was obtained from the measurement results by plotting the amount of elongation TMA of the sample on the Y-axis (the vertical axis on the left in FIG. 1) and the temperature on the X-axis. The DELTATMA curve shown in FIG. 1 was obtained by plotting the change in the amount of elongation of the sample DELTATMA per 1° C. difference in temperature on the Y-axis (the vertical axis on the right in FIG. 1) and the temperature on the X-axis. That is, DELTATMA corresponds to the differential of TMA per 1° C. difference in temperature. Here, the "amount of elongation of the sample" is the amount of elongation in the height of the cylindrical glass sample. Difference in temperature DELTAT is a constant positive value of 1° C. or less, as set forth above. When DELTAT is made 1° C., measurements of adequate precision can be obtained.

Figure 1:
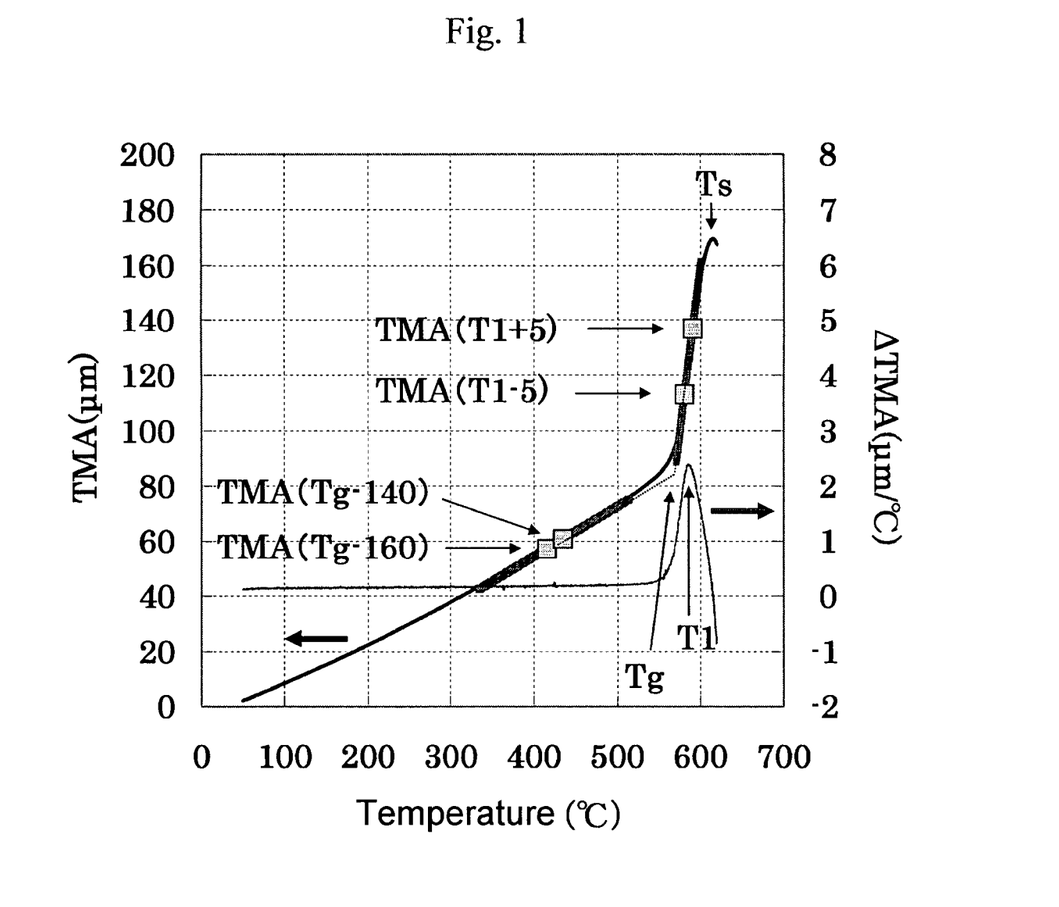
FIG. 1 is a TMA curve and DELTATMA curve of the glass of Example 1.

2. The temperature T1 at which DELTATMA (the differential in the amount of elongation of the sample) reached a maximum was looked up on the DELTATMA curve obtained in 1.

3. Based on the TMA curve, the glass transition temperature Tg was determined according to the standards of the Optical Glass Industry Association and the temperature Ts at which the TMA reached a maximum was obtained.

4. The elongation of the samples at T1−5° C. and T1+5° C. was obtained from the T1 obtained in 2 and the TMA curve: TMA (T1−5) and TMA (T1+5).

5. The elongation of the samples at Tg−160° C. and Tg−140° C. was determined from the Tg obtained in 3 and the TMA curve: TMA (Tg−160) and TMA (Tg−140).

6. The typical value alpha1 of the average coefficient of linear expansion over the temperature range from the glass transition temperature (Tg) to the sag temperature (Ts) was calculated as: alpha1(/° C.)={TMA (T1+5)-TMA (T1−5)}/sample length/{5° C.−(−5° C.)}.

7. The typical value alpha2 of the average linear expansion rate below Tg was calculated as: alpha2(/° C.)={TMA (Tg−140° C.)-TMA (Tg−160° C.)}/sample length/{140° C.−(−160° C.)}. The "sample length" means the length of the sample at 25° C., which was 20 mm.

8. The alpha1/alpha2 ratio was calculated from the alpha1 and alpha2 values obtained.

The refractive index (nd), Abbé number (nud), and specific gravity of the optical glasses of Examples 1 to 18 and Comparative Examples 1 and 2 were measured by the following methods. The results are given in Table 2.

(1) Refractive index (nd) and Abbé number (nud)

Measured for optical glass obtained at a gradual cooling rate of 30° C./hour.

(2) Specific gravity

Calculated by Archimedes' method.

TABLE 1

| | Mol % | | | | | | | | | | | | |
|---|---|---|---|---|---|---|---|---|---|---|---|---|---|
| | $B_2O_3$ | $SiO_2$ | $Al_2O_3$ | $La_2O_3$ | $Gd_2O_3$ | $Y_2O_3$ | $ZrO_2$ | $Ta_2O_5$ | CaO | BaO | ZnO | $Li_2O$ | Total |
| Ex. 1 | 34.64 | 23.45 | 1.27 | 4.87 | 3.46 | 0.63 | 1.98 | 0.75 | 6.25 | 0.00 | 10.84 | 11.86 | 100.00 |
| Ex. 2 | 35.50 | 21.00 | 1.00 | 6.00 | 4.00 | 1.50 | 2.50 | 0.00 | 5.00 | 0.00 | 13.00 | 10.50 | 100.00 |

TABLE 1-continued

| | Mol % | | | | | | | | | | | | |
|---|---|---|---|---|---|---|---|---|---|---|---|---|---|
| | $B_2O_3$ | $SiO_2$ | $Al_2O_3$ | $La_2O_3$ | $Gd_2O_3$ | $Y_2O_3$ | $ZrO_2$ | $Ta_2O_5$ | CaO | BaO | ZnO | $Li_2O$ | Total |
| Ex. 3 | 34.00 | 21.00 | 1.00 | 6.00 | 4.00 | 1.50 | 2.50 | 0.00 | 5.00 | 0.00 | 13.00 | 12.00 | 100.00 |
| Ex. 4 | 35.50 | 21.00 | 1.00 | 6.00 | 3.00 | 1.50 | 2.50 | 0.00 | 5.00 | 0.00 | 13.00 | 11.50 | 100.00 |
| Ex. 5 | 35.50 | 21.00 | 1.00 | 6.50 | 3.00 | 1.50 | 2.00 | 0.00 | 3.50 | 0.00 | 13.00 | 13.00 | 100.00 |
| Ex. 6 | 35.50 | 21.00 | 1.00 | 8.00 | 1.50 | 1.50 | 2.00 | 0.00 | 3.50 | 0.00 | 12.00 | 14.00 | 100.00 |
| Ex. 7 | 35.50 | 21.00 | 1.00 | 5.20 | 4.00 | 1.50 | 2.50 | 0.00 | 5.00 | 0.00 | 13.00 | 11.30 | 100.00 |
| Ex. 8 | 34.00 | 21.00 | 1.00 | 6.00 | 3.50 | 1.50 | 1.50 | 0.00 | 5.00 | 0.00 | 13.00 | 13.50 | 100.00 |
| Ex. 9 | 34.00 | 21.00 | 1.00 | 5.50 | 3.50 | 1.50 | 2.00 | 0.00 | 5.00 | 0.00 | 13.00 | 13.50 | 100.00 |
| Ex. 10 | 31.00 | 24.00 | 1.00 | 6.00 | 4.50 | 0.00 | 1.50 | 0.00 | 5.00 | 3.00 | 9.50 | 14.50 | 100.00 |
| Ex. 11 | 36.00 | 21.00 | 1.00 | 4.00 | 3.30 | 1.00 | 1.00 | 0.00 | 11.00 | 0.00 | 8.00 | 13.70 | 100.00 |
| Ex. 12 | 50.50 | 11.00 | 0.00 | 10.0 | 2.50 | 3.50 | 1.20 | 0.00 | 5.00 | 0.00 | 8.80 | 7.50 | 100.00 |
| Ex. 13 | 50.00 | 11.00 | 0.00 | 9.50 | 3.50 | 3.00 | 1.20 | 0.00 | 4.00 | 0.00 | 8.80 | 9.00 | 100.00 |
| Ex. 14 | 46.00 | 14.50 | 0.00 | 8.50 | 5.50 | 2.00 | 0.00 | 0.00 | 4.50 | 0.00 | 11.00 | 8.00 | 100.00 |
| Ex. 15 | 46.50 | 14.00 | 0.00 | 8.50 | 5.50 | 2.00 | 0.00 | 0.00 | 5.50 | 0.00 | 11.00 | 8.00 | 100.00 |
| Ex. 16 | 51.70 | 8.40 | 0.00 | 11.30 | 7.80 | 1.30 | 2.90 | 0.00 | 0.70 | 0.00 | 11.70 | 4.20 | 100.00 |
| Ex. 17 | 52.60 | 8.10 | 0.00 | 11.20 | 7.80 | 1.20 | 1.40 | 0.00 | 2.00 | 0.00 | 11.70 | 4.00 | 100.00 |
| Ex. 18 | 59.90 | 7.50 | 0.00 | 11.00 | 8.80 | 1.10 | 0.00 | 0.00 | 0.00 | 0.00 | 5.10 | 6.60 | 100.00 |
| Comp. Ex. 1 | 40.00 | 12.00 | 0.00 | 6.50 | 0.00 | 3.00 | 2.50 | 0.00 | 14.00 | 0.00 | 11.00 | 11.00 | 100.00 |
| Comp. Ex. 2 | 50.00 | 13.00 | 0.00 | 9.00 | 2.00 | 4.00 | 0.00 | 0.00 | 10.00 | 0.00 | 4.00 | 8.00 | 100.00 |

TABLE 2

| | Specific gravity | nd | vd | Tg (° C.) | Ts (° C.) | α1 | α2 | α1/α2 |
|---|---|---|---|---|---|---|---|---|
| Ex. 1 | 3.66 | 1.66462 | 53.56 | 524 | 575 | 1214 | 92.3 | 13.2 |
| Ex. 2 | 3.81 | 1.69984 | 53.02 | 533 | 581 | 1386 | 94.5 | 14.7 |
| Ex. 3 | 3.81 | 1.70151 | 52.71 | 520 | 567 | 1207 | 97.6 | 12.4 |
| Ex. 4 | 3.70 | 1.69261 | 53.20 | 523 | 571 | 1083 | 92.6 | 11.7 |
| Ex. 5 | 3.73 | 1.69344 | 53.18 | 519 | 566 | 1333 | 92.9 | 14.3 |
| Ex. 6 | 3.69 | 1.69574 | 53.07 | 513 | 559 | 1253 | 113 | 11.1 |
| Ex. 7 | 3.75 | 1.69377 | 53.33 | 527 | 573 | 993 | 92.0 | 10.8 |
| Ex. 8 | 3.75 | 1.69395 | 53.22 | 512 | 558 | 1299 | 94.6 | 13.7 |
| Ex. 9 | 3.72 | 1.69207 | 53.20 | 512 | 558 | 1229 | 91.6 | 13.4 |
| Ex. 10 | 3.82 | 1.69259 | 53.24 | 506 | 554 | 1167 | 101 | 11.6 |
| Ex. 11 | 3.47 | 1.66935 | 55.46 | 526 | 574 | 1223 | 95.8 | 12.8 |
| Ex. 12 | 3.88 | 1.71335 | 54.00 | 580 | 625 | 1475 | 90.4 | 16.3 |
| Ex. 13 | 3.90 | 1.71359 | 53.82 | 572 | 615 | 1124 | 93.5 | 12.0 |
| Ex. 14 | 4.00 | 1.71314 | 53.90 | 571 | 615 | 1186 | 88.5 | 13.4 |
| Ex. 15 | 4.01 | 1.71390 | 53.84 | 571 | 613 | 1454 | 93.3 | 15.6 |
| Ex. 16 | 4.38 | 1.74997 | 51.53 | 609 | 649 | 1198 | 88.6 | 13.5 |
| Ex. 17 | 4.34 | 1.74370 | 52.15 | 608 | 648 | 1117 | 88.6 | 12.6 |
| Ex. 18 | 4.19 | 1.72346 | 54.48 | 615 | 655 | 1258 | 89.4 | 14.1 |
| Comp. Ex. 1 | 3.52 | 1.6935 | 53.20 | 525 | 569 | 1792 | 104 | 17.2 |
| Comp. Ex. 2 | 3.70 | 1.69822 | 55.50 | 588 | 629 | 1655 | 94.4 | 17.5 |

Manufacturing Preforms for Press Molding

Clarified and homogenized glass melts corresponding to Examples 1 to 18 and Comparative Examples 1 and 2 were caused to flow at a constant rate out of a pipe made of platinum alloy adjusted to a temperature within the temperature range at which the glasses could flow stably without devitrifying. Glass melt gobs having the weight of the targeted preform were separated by the drip method or drop-cut method. The glass melt gobs were then received by a receiving mold having gas blow holes in the bottom thereof, gas was blown out through the gas blow holes, and preforms for precision press molding were molded while the glass gobs were being floated. The separation interval of the glass melt was adjusted and set to obtain spherical glass preforms 2 to 10 mm in diameter and oblate spheroidal preforms 5 to 25 mm in diameter.

Manufacturing Optical Elements (Aspherical Lenses)

Figure 2:
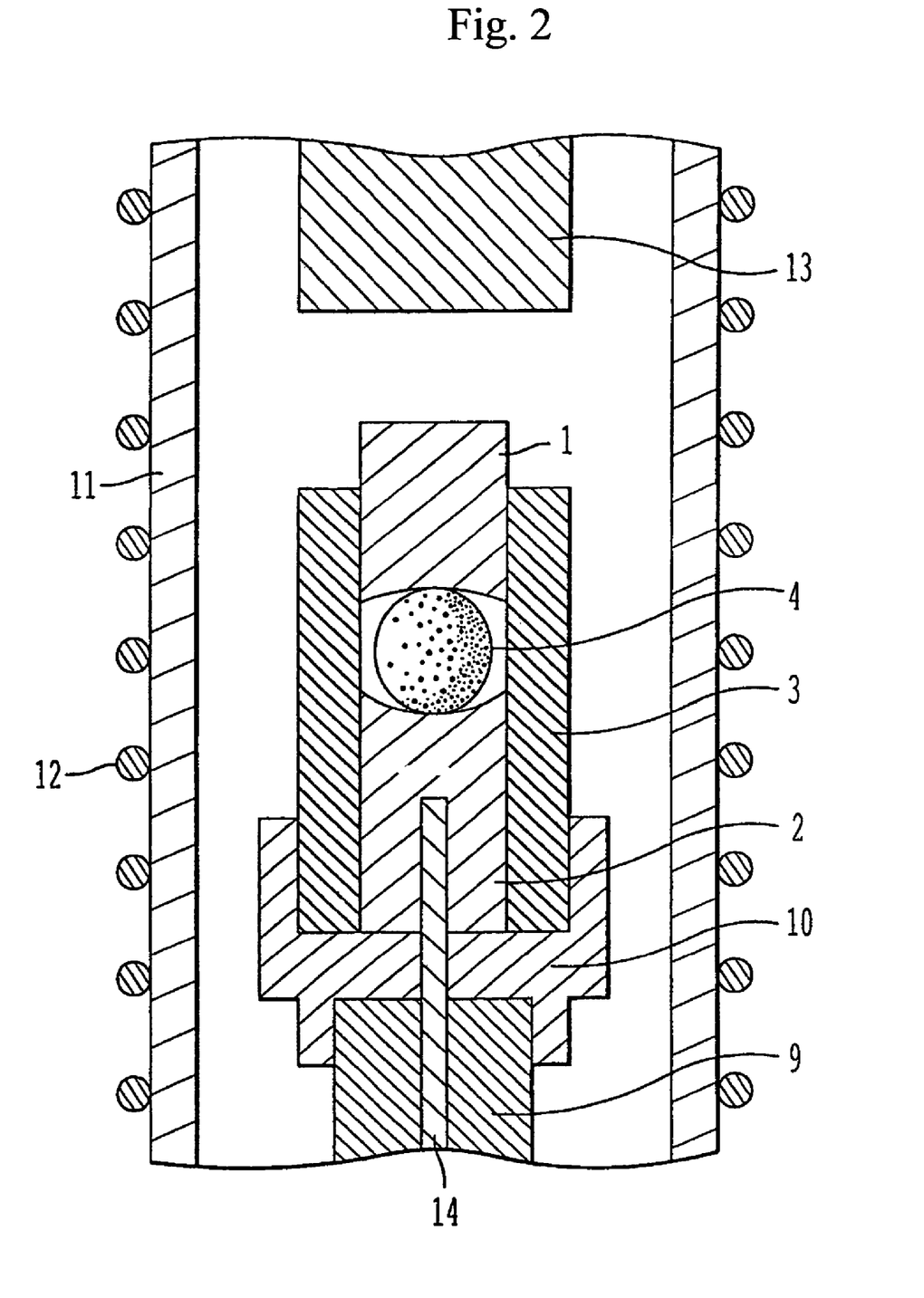
FIG. 2 is a schematic diagram of a precision press mold.

The preforms obtained by the above-described method were precision press molded using the pressing machine shown in FIG. 2 to obtain aspherical lenses. Specifically, a preform 4 was placed between a lower mold 2 and an upper mold 1 constituting a pressing mold, the interior of quartz tube 11 was backfilled with a nitrogen atmosphere, and a heater 12 was turned on to heat the interior of quartz tube 11. The interior of the pressing mold was set to a temperature at which the glass being molded exhibited a viscosity of $10^8$ to $10^{10}$ dPa·s. While maintaining this temperature, a pressure rod 13 was lowered, pressing down on upper mold 1 to press the preform that had been placed within the pressing mold. The pressure employed in pressing was 8 MPa and the pressing time was 30 sec. In FIG. 2, a sleeve mold 3, also known as a drum mold, determined the relative positioning of upper mold 1 and lower mold 2, performing the function of restricting spreading of the glass. A support rod 9 served to bear the pressure applied by pressure rod 13. A pressing mold holder 10 served to hold the pressing mold. A thermocouple 14 served to monitor the temperature of lower mold 2. Following pressing, the pressure employed in pressing was released. The molded glass article that had been press molded was gradually cooled to a temperature at which the glass exhibited a viscosity of $10^{12}$ dPa·s or more while still in contact with lower mold 2 and upper mold 1, and then rapidly cooled to room temperature. The molded glass article was then removed from the pressing mold, yielding an aspherical lens.

When employing the glasses of Examples 1 to 18, almost no damage to the glass was observed during precision press molding. In particular, for the glasses of Examples 1 to 11, 13, 14, and 16 to 18, which had an alpha1/alpha2 ratio of 15 or less, no damage was observed. By contrast, damage to the glass was frequently observed during precision press molding of the glasses of Comparative Examples 1 and 2.

As is clear from these results, all of the glasses of Examples 1 to 18 had the desired optical properties as well as good moldability, permitting precision press molding with a pressing mold without damage to the glass.

The present invention provides an optical glass having desired optical constants suited to precision press molding. Preforms for precision press molding can be manufactured with high productivity from the optical glass of the present invention. The present invention further provides optical elements comprised of this optical glass with high productivity.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An optical glass comprising:
a glass wherein
(i) $SiO_2$, $B_2O_3$, $La_2O_3$ and $Gd_2O_3$ are contained as essential components;
(ii) the combined quantity of $SiO_2$ and $B_2O_3$ ranges from 50 to 72 mole percent;
(iii) the mole ratio ($SiO_2/B_2O_3$) of the $SiO_2$ content to the $B_2O_3$ content is in a range that exceeds 0.5 but does not exceed 0.90;
(iv) the quantity of $La_2O_3$ ranges from 4.87 to 10 mole percent; and
(v) the quantity of $Gd_2O_3$ ranges from 3.30 to 8 mole percent,
wherein said glass has a refractive index (nd) within the range of 1.65 to 1.70 and an Abbé number (ν (nu)d) of greater than or equal to 50 for use in precision press molding, exhibiting that a ratio α (alpha)1/α (alpha)2 is less than 17 when temperature denoting maximum value of differential in amount of elongation of glass relative to temperature differential DELTAT (where DELTAT denotes a constant value of 1° C. or less) over a temperature range from glass transition temperature (Tg) to sag temperature (Ts) is denoted as T1, average coefficient of linear expansion over a range from T1−5° C. to T1+5° C. is denoted as alpha1, and average coefficient of linear expansion over a range from the glass transition temperature (Tg)−160° C. to the glass transition temperature (Tg)−140° C. is denoted as alpha2.

2. An optical glass comprising:
a glass wherein
(i) $SiO_2$, $B_2O_3$, $La_2O_3$ and $Gd_2O_3$ are contained as essential components;
(ii) the content of $SiO_2$ ranges from 11 to 18 mole percent;
(iii) the content of $La_2O_3$ ranges from 5 to 15 mole percent;
(iv) the content of $Gd_2O_3$ ranges from 1 to 12 mole percent;
(v) the combined quantity of $SiO_2$ and $B_2O_3$ ranges from 50 to 72 mole percent;
(vi) the mole ratio ($SiO_2/B_2O_3$) of the $SiO_2$ content to the $B_2O_3$ content ranges from 0.1 to 0.90, and
wherein said glass has a refractive index (nd) that exceeds 1.70 and an Abbé number (ν (nu)d) of greater than or equal to 50 for use in precision press molding, exhibiting that a ratio α (alpha)1/α (alpha)2 is less than 17 when temperature denoting maximum value of differential in amount of elongation of glass relative to temperature differential DELTAT (where DELTAT denotes a constant value of 1° C. or less) over a temperature range from glass transition temperature (Tg) to sag temperature (Ts) is denoted as T1, average coefficient of linear expansion over a range from T1−5° C. to T1+5° C. is denoted as alpha1, and average coefficient of linear expansion over a range from the glass transition temperature (Tg)−160° C. to the glass transition temperature (Tg)−140° C. is denoted as alpha2.

3. A preform for precise press molding comprised of an optical glass of claim 1.

4. An optical element comprised of an optical glass of claim 1.

5. A method of manufacturing an optical element comprising heating a preform of claim 3 and precision press molding the heated preform with a precision pressing mold to manufacture an optical element.

6. A preform for precise press molding comprised of an optical glass of claim 2.

7. An optical element comprised of an optical glass of claim 2.

8. A method of manufacturing an optical element comprising heating a preform of claim 6 and precision press molding the heated preform with a precision pressing mold to manufacture an optical element.

* * * * *